C. CARSON.
RADIATING SYSTEM FOR INTERNAL COMBUSTION MOTORS.
APPLICATION FILED JUNE 25, 1917.

1,336,613.  Patented Apr. 13, 1920.

UNITED STATES PATENT OFFICE.

CLARK CARSON, OF DAVENPORT, IOWA.

RADIATING SYSTEM FOR INTERNAL-COMBUSTION MOTORS.

1,336,613.     Specification of Letters Patent.     Patented Apr. 13, 1920.

Application filed June 25, 1917. Serial No. 176,731.

*To all whom it may concern:*

Be it known that I, CLARK CARSON, a citizen of the United States, residing at Davenport, in the county of Scott and State of Iowa, have invented certain new and useful Improvements in Radiating Systems for Internal-Combustion Motors, of which the following is a specification.

This invention relates to an improved radiating system for internal combustion motors, and more especially for use on automobiles that have been converted into tractors.

When an automobile has been converted into a tractor, the great amount of additional work to be performed naturally necessitates considerably more water in order to keep the internal combustion motor properly cooled because of the greater evaporation, and it is for the provision of this additional water supply that my improved radiating system is intended.

One of the objects of this invention is to provide such a radiating system that the water in the radiator will be kept at substantially a constant level at all times.

A further object of this invention is to provide an air tight cooling-liquid reservoir, with such form of connection to the radiator of an internal combustion motor that when the water in the radiator falls below a certain predetermined level, air will enter the tank or reservoir and permit a certain amount of water to enter the radiator, and thus eliminate all danger of the radiator becoming empty.

A further object of this invention is to provide a water-tight sliding connection between the pipe leading from the air-tight reservoir, and the upper portion of the radiator.

A further object of this invention is to provide an air-tight reservoir in which is formed a partition, thus dividing the reservoir into two compartments for reception of the cooling-liquid and the oil, respectively.

A still further object is the provision of such a radiating system that its parts may be quickly and easily mounted upon, or removed from, the frame work of most any automobile.

Further objects and advantages will appear as the following description proceeds.

In the accompanying drawings, while I have illustrated a preferred embodiment of my invention, I desire it to be understood that the same is susceptible of modification and change without departing from the spirit of this invention, except as limited by the appended claims.

Figure 1:
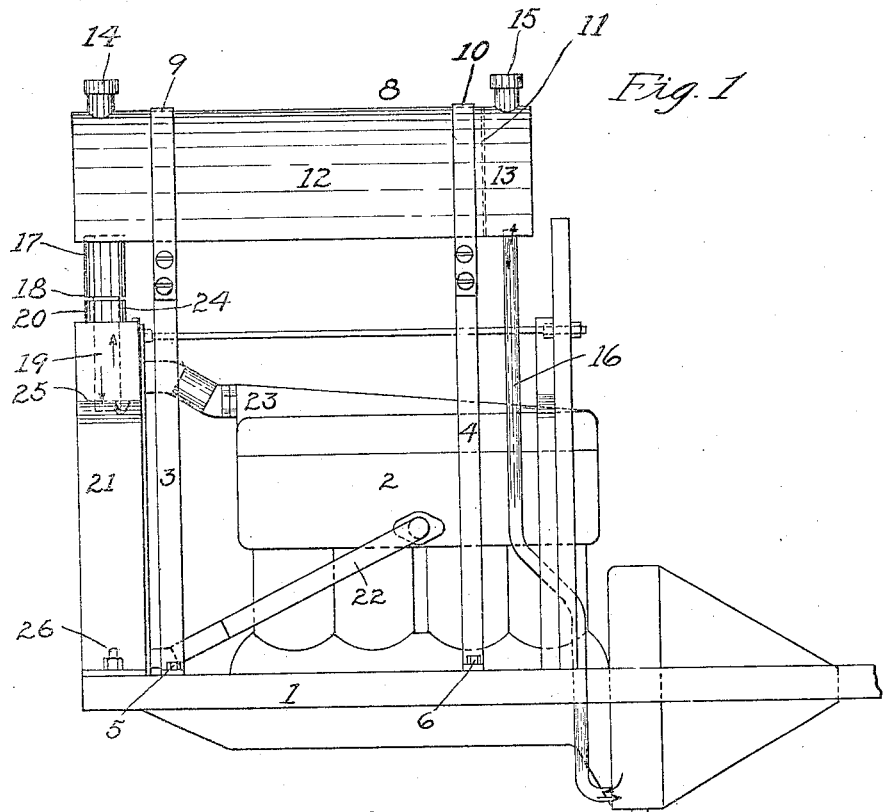
Figure 1 is a side elevation of my improved radiating system, and showing the same mounted upon the front portion of an automobile frame.
Figure 2:
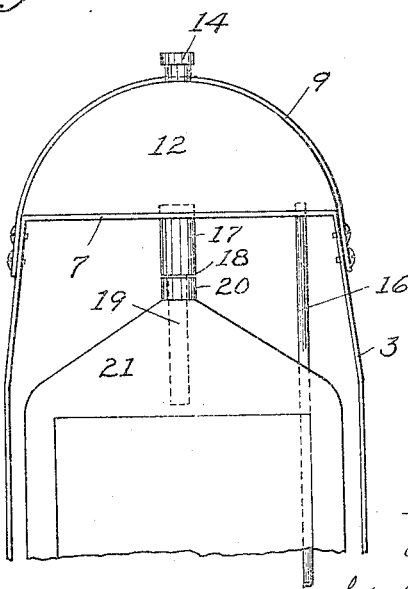
Fig. 2 is a front elevation of the tank in my improved system and the upper portion of the radiator.

Referring to the drawings: Upon the front portion of the automobile side frame 1 is mounted the usual internal combustion motor 2. Also mounted upon this side frame and suitably spaced apart are supporting members 3 and 4, suitably secured to the automobile frame by bolts 5 and 6. The upper portion of each of the members 3 and 4 is formed into a flat portion 7, upon which is mounted the air-tight tank or reservoir indicated generally by 8, which tank or reservoir is suitably secured upon the flat portion 7 by means of the straps 9 and 10, which are fastened at their end portions to the supporting members 3 and 4 in a suitable manner. This tank 8 is provided with a partition 11, which divides the tank into two compartments 12 and 13, the former of which is to be used for the reception of a suitable cooling-liquid such as water or the like, and the latter of which is to contain lubricating or fuel oil. As shown in the drawing it is intended for the reception of lubricating oil. The compartments 12 and 13 are each provided with an air-tight cap 14 and 15, respectively. Leading from the compartment 13 is the pipe 16, which connects the oil compartment 13 with the motor. It is, of course, understood that if the reservoir is to be used for fuel oil, as stated above, suitable connection must be made from the reservoir to the gasolene supply line (including the carbureter) instead of to the engine casing as shown.

Secured at one end of the bottom portion of the compartment 12 is the pipe 17, which is reduced in diameter at the point 18 to form the smaller pipe 19. The boss or sleeve 20 is secured to the top portion of the radiator 21, which radiator has suitable connections in order to maintain cooling circulation with the internal combustion motor 2, by means of the pipes 22 and 23. A bore 24 is provided through the sleeve or boss 20, through which bore the pipe 19 has a sliding fit, which sliding fit may be made watertight in any suitable manner, such as by the closeness of the fit, the use of packing, or the like, as desired. As will be seen upon inspection of Fig. 1 of the drawings, when the compartment 12 of the tank 8 is filled with water, the same will flow through the radiating system until it rises in the radiator to the level 25, which level is slightly above the bottom portion of the pipe 19. The water is poured into the compartment 12 until it is completely filled, after which the air-tight cap 14 is screwed in place. The radiator 21 is secured to the frame 1 by means of bolts 26.

As before stated, when an automobile is converted for use into a tractor, a larger amount of cooling fluid is required. It will be seen that this increased fluid is provided in my improved system, and furthermore, that when the water in the radiator falls below the bottom of the pipe 19, air will enter through this pipe into the water tank 12, and thereupon permit a certain amount of water to flow into the radiator 21. When this amount of water is sufficient to raise the level of the water in the radiator a slight distance above the lower end of the pipe 19, the further flow of air into the tank 12 is stopped, which in turn stops the further rise of the water in the radiator 21. It will thus be seen that I have provided an improved system of radiation in which the water in the radiator will be maintained at a substantially constant level. Also by provision of the sliding fit of the pipe 19 in the upper portion of the radiator 21, I have eliminated all danger of leakage resulting from any possible movement of the tank 12, with relation to the radiator 21, by reason of any bending or possible movement of the uprights 3 and 4. Should such bending of the uprights 3 and 4 take place, the pipe 19 by virtue of the sliding fit in the boss 20, will merely move up and down therein instead of being so jarred and forced as to create a leak at this portion of the radiator.

By virtue of the easy removal of any one or more of the bolts 5, 6 and 26, it is apparent that my improved radiating system may be quickly and readily mounted upon, or when desired, removed from, the frame work of any ordinary automobile. This makes possible the use if desired of the radiator 21 alone, and when the machine is called upon to do extra heavy work, as for example its conversion into a tractor, the additional cooling fluid may be quickly made available by simply mounting the supports 3 and 4 and the tank 8 in place upon the frame 1. The addition of the tank 8 may also be desired where long runs are to be made through territory where the water supply may not be readily replenished.

My improved system can be used to great advantage on any automobile requiring considerable cooling fluid. However, it is especially adapted for use on those automobiles that have been converted into tractors, thus requiring a considerably greater amount of work from the engines thereof, and a correspondingly increased supply of cooling fluid in order to keep the engine sufficiently cool.

It will, of course, be understood that connections other than those shown in the drawings may be utilized for connecting the reservoir with the radiator, for example, the reservoir may be connected to the radiator by a pipe or flexible tube extending downwardly from the reservoir loosely through the usual opening in the top of the radiator.

It will also be seen that by provision of the oil compartment 13 and the air-tight cap 15, the flow of oil can, if desired, be controlled by suitable manipulation of the cap 15.

Having now described my invention, I claim:—

1. In a radiating system for internal combustion motors, an air-tight reservoir, a radiator, a pipe extending from said reservoir a short distance vertically directly into said radiator.

2. In a radiating system for internal combustion motors, an air-tight cooling-liquid reservoir, a radiator, a vertical pipe secured to the bottom of said reservoir and extending vertically a short distance directly into the top of said radiator, whereby the cooling-liquid in said radiator will be maintained at substantially a constant level.

3. In a radiating system for internal combustion motors, an air-tight cooling-liquid reservoir, a radiator, a vertical pipe secured to the bottom of said reservoir and extending vertically a short distance into the top of said radiator, whereby the cooling-liquid in said radiator will be maintained at substantially a constant level, said pipe having a sliding connection through the top of said radiator.

4. In a radiating system for internal combustion motors, an air-tight cooling-liquid reservoir, a radiator, a vertical pipe secured to the bottom of said reservoir and extending vertically a short distance into the top of said radiator, whereby the cooling-liquid in said radiator will be maintained at substantially a constant level, said pipe having a water-tight sliding connection through the top of said radiator.

5. An auxiliary water supply system for internal combustion motors comprising a water supply tank adapted to be supported over the motor, said tank having a water feed pipe connected thereto to draw water from adjacent the bottom of the tank, said pipe being adapted to be connected with the radiator by a sliding watertight connection.

6. In a radiating system for internal combustion motors, a reservoir, a radiator, a pipe secured to the bottom of said reservoir and extending vertically a short distance into the upper portion of said radiator, a second pipe secured to said radiator adjacent the bottom thereof, and a third pipe secured to said radiator at a point slightly above the lower end of said first mentioned pipe, said second pipe and said third pipe being adapted to connect said radiator with the cooling jacket of an internal combustion engine.

7. In a liquid supply system for internal combustion motors, an air-tight tank, a partition in said tank dividing said tank into an oil compartment and a cooling-liquid compartment, a pipe connecting said oil compartment with the part of the power plant to be supplied with oil, a radiator, and means connecting said cooling-liquid compartment and said radiator whereby the cooling-liquid in said radiator will be maintained at substantially a constant level.

8. In a radiating system for internal combustion motors, a reservoir adapted to furnish the radiator of the motor with an additional supply of water, a pipe secured in the bottom of said reservoir, the upper end of said pipe extending a slight distance above the bottom of said reservoir, whereby any sediment will settle below the top of said pipe and not be carried thereinto.

9. In a radiating system for internal combustion motors, an air-tight tank having a partition therein to provide a water compartment and an oil compartment, and an outlet pipe in the bottom of each compartment extending slightly above said bottom within the compartments, whereby to permit any sediment to settle in said tank and not pass through said pipes, said pipes leading only downwardly and laterally externally of the tank, the pipe from the water compartment being connected to the filling opening of the radiator.

10. In a radiating system for internal combustion motors, a radiator, an air-tight tank having a partition to divide the tank into a water compartment and an oil compartment, a pipe connecting said water compartment with and extending vertically a short distance into said radiator, whereby to maintain the water in said radiator at substantially a constant level, a pipe connecting the oil compartment with the part of the power plant to be supplied with oil, each of said pipes extending slightly above the bottom of said tank to trap sediment.

11. In a radiating system for internal combustion motors, a reservoir, a radiator, a pipe secured to the bottom of said reservoir and feeding water directly to said radiator, a sleeve on said radiator, said pipe passing through said sleeve and having a sliding water-tight fit therein.

12. In a radiating system for an internal combustion engine having a radiator, a frame adapted to be mounted on the front portion of an automobile, a reservoir on said frame above said radiator, a pipe secured to the bottom of said reservoir and feeding water directly to said radiator, a boss on said radiator having a circular bore therethrough, said pipe passing into said radiator and having a sliding water-tight fit in the bore of said boss.

13. In a radiating system for internal combustion motors in combination with the frame of an automobile, a pair of spaced U-shaped uprights on said frame, an air-tight tank supported on said uprights, straps secured at each end to said uprights and passing over said tank, a radiator beneath said tank, a pipe secured to the bottom of said tank and passing through the top of said radiator, said pipe having a sliding water-tight connection with said top and extending a slight distance into the upper portion of said radiator, whereby the cooling-liquid in said radiator will be maintained at a substantially constant level.

14. In a radiating system for internal combustion motors, a supplemental reservoir, a radiator, a pipe for connecting said supplemental reservoir with said radiator so that the cooling liquid in the radiator will be maintained at a substantially constant level.

15. In a radiating system for internal combustion motors, a radiator, a supplemental reservoir, positioned above the radiator, and a pipe connected with said reservoir extending downwardly through the top of said radiator, whereby the cooling liquid in said radiator will be maintained at substantially constant level.

16. An auxiliary water supply system for internal combustion motors comprising a water supply tank adapted to be supported over the motor, said tank having a water feed pipe connected thereto to draw water from adjacent the bottom of the tank, said pipe being adapted to be connected with the radiator by a sliding watertight connection, said pipe having a length adapting it to enter the top of the radiator a short distance, whereby water may be automatically fed to the radiator to maintain the water level therein substantially constant.

In witness whereof I hereunto subscribe my name to this specification in the presence of two witnesses.

CLARK CARSON.

Witnesses:
CLARENCE J. LOFTUS,
EDITH OLSON.